No. 641,926.  
Patented Jan. 23, 1900.

M. E. BOLLINGER.
DRIVING MECHANISM FOR CYCLES.
(Application filed Mar. 30, 1899.)

(No Model.)

Witnesses  
Martin E. Bollinger. Inventor  
By his Attorneys.

THE NORRIS PETERS CO., PHOTO-LITHO., WASHINGTON, D. C.

UNITED STATES PATENT OFFICE.

MARTIN E. BOLLINGER, OF SELL'S STATION, PENNSYLVANIA.

DRIVING MECHANISM FOR CYCLES.

SPECIFICATION forming part of Letters Patent No. 641,926, dated January 23, 1900.

Application filed March 30, 1899. Serial No. 711,091. (No model.)

*To all whom it may concern:*

Be it known that I, MARTIN E. BOLLINGER, a citizen of the United States, residing at Sell's Station, in the county of Adams and State of Pennsylvania, have invented a new and useful Driving Mechanism for Cycles, of which the following is a specification.

This invention relates to cycles, and more especially to driving or propelling mechanism therefor; and the object of the invention is to provide an efficient and compact organization of parts which are adapted to coöperate for the purpose of increasing the power applied to propel the cycle when such increase is desired, or one part of the driving mechanism can be utilized to hold the cycle back when descending hills, thereby obviating the use of a brake.

With these ends in view my invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1:
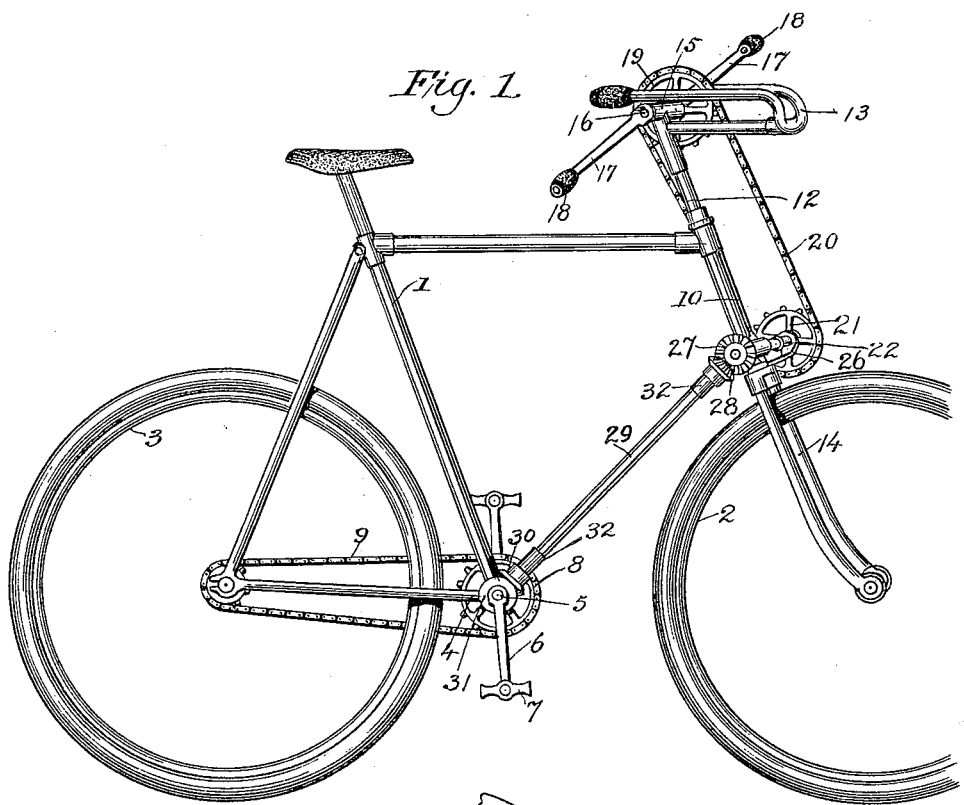
Figure 2:
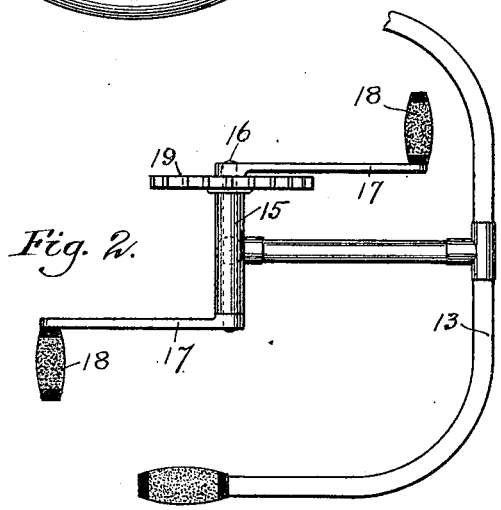
Figure 3:
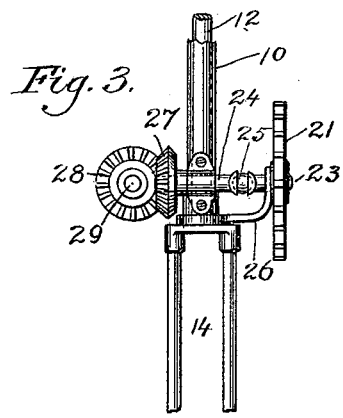

Figure 1 is a perspective view of a bicycle provided with driving mechanism constructed in accordance with my invention. Fig. 2 is a top plan view of the steering appliances and a portion of the auxiliary driving mechanism. Fig. 3 is a front elevation of a portion of the auxiliary driving mechanism.

Like characters denote like and corresponding parts in each of the several figures of the drawings.

I have illustrated my improvements as applied to a bicycle which is of the familiar diamond shape, and the framework of which is denoted by 1 and the front and rear wheels by 2 and 3, respectively. The crank axle or shaft is designated by 5 and is mounted in the usual manner in a hanger at the meeting-point of the seat-tube, bottom bar, and tie-rods and is provided at its opposite ends with cranks 6, provided with pedals 7, and the last-named parts may be of any suitable construction.

The axle 5 is provided with the sprocket-wheel 8, which is connected by the sprocket-chain 9 with a similar sprocket-wheel on the axle of the rear or driven wheel, and it will be apparent that the rotation of the cranks will cause the propulsion of the cycle in the usual manner.

The front tube 10 of the framework receives the steering-head 12, provided at its upper end with the handle 13 and connected at its lower end to the front fork 14.

The description thus far made pertains to a bicycle of ordinary construction and to which the supplemental driving mechanism hereinafter described is applied; but it will be apparent that the latter can be used in connection with other kinds of foot-propelled vehicles.

The steering-head is provided at a point slightly above the place at which the handle 13 is secured thereto with a longitudinal bearing-sleeve 15, which receives the shaft 16, having at its opposite ends the cranks 17, which are provided at their extremities with grips 18 of suitable kind, adapted to be grasped by the hands of a rider in the saddle of the machine, so that he can rotate said shaft 16, and consequently, through intermediate mechanism, transmit the power to the rear or driven wheel of the machine. The handle 13 is substantially of double-U shape, and it extends forward from its point of attachment to the steering-head, and the outer branches of the two portions of said handle extend rearward and are provided with grips, and by reason of the shape of the handle the cranks 17 as they move forward are adapted to pass between the branches of the two U's without hindrance.

When the auxiliary mechanism is not in use, the handle 13 will be employed to guide the cycle; but when said mechanism is in operation the crank-shaft 16 will serve as a means for steering the machine, as it will be remembered that it is connected with the steering-head. Therefore the crank-shaft, with its cranks, is in the nature of a combined steering and power-transmitting member, as it performs both of these functions.

The crank-shaft at one end is provided with a sprocket-wheel 19, connected by the sprocket-chain 20 with the sprocket-wheel 21, which is carried by the shaft 22.

The shaft 22 consists of two sections, denoted, respectively, by 23 and 24, connected by a universal joint 25, that illustrated being of the ball-and-socket type, and the section 23 of the shaft is movable longitudinally, while the section 24 is fixed and is supported by a bearing upon the steering-head tube, near the lower end thereof. The movable section of the shaft carries the sprocket-wheel 21 and is supported by the vertical arm of a substantially L-shaped bracket 26, secured to the fork-crown, said arm having an opening in which the shaft-section slides longitudinally as the steering-head turns. The horizontal portion of the bracket 26 is secured to the fork 14, near the upper end thereof. The fixed section 24 of the two-part shaft carries at its outer end the bevel-gear 27, meshing with a coöperating bevel-gear 28, secured to the end of the longitudinal shaft 29, and which shaft is provided with a bevel-gear 30 at its opposite end, meshing with a bevel-gear 31, fixed to the end of the crank-axle 5 opposite to that carrying the primary or driving sprocket-wheel 8. The longitudinal shaft 29 is supported near its extremities by bearing-sleeves 32, secured to the framework of the machine near the fork and crank-axle, respectively.

From the foregoing description it will be evident that both driving mechanisms can be operated in unison or either can be employed separately, or when one of them is in use the other can be utilized to hold back the cycle in descending hills, and it will be apparent that in view of the universal joint 25 between the two sections of the shaft 22 the front wheel can be turned to any extent without affecting the power generated by the auxiliary driving mechanism.

The cycle includes two independent steering devices, and the handle 13, which constitutes one of them, will be employed when the auxiliary driving mechanism is out of action, in which case the several elements of the latter operate without producing any effect; but when the rider wishes to utilize said auxiliary driving mechanism the crank-shaft 16 will serve as a means for turning the steering-head.

While I have shown certain kinds of mechanical devices for transmitting the motion and power from the primary driving members of the two independent propelling mechanisms, it is apparent that other means may be provided for this purpose, although the mechanism illustrated is thoroughly efficient and simple.

Changes in the form, proportion, size, and the minor details of construction within the scope of the appended claims may be resorted to without departing from the spirit or sacrificing any of the advantages of this invention.

Having thus described the invention, what I claim is—

1. In a driving mechanism for cycles, the combination with a bicycle-frame and with a wheel to be driven, of a steering-stem movable in the frame, a shaft secured to said steering-stem and having cranks, a second shaft in two sections one of which has a bearing fixed to the frame, and the other of which has a bearing movable with the steering-stem and which sections are connected by a universal joint, operatively-connected devices on the crank-shaft and on the movable section of the two-part shaft for conveying motion from the former to the latter, power-transmitting mechanism operatively connected respectively with the fixed section of said shaft and with said wheel, and handles independent of the crank-shaft and secured to a forwardly-extending bracket upon the steering-stem, said handles lying at either side of the power-transmitting mechanism, substantially as described.

2. In a driving mechanism for cycles, the combination with a bicycle-frame and a wheel to be driven, of a steering-stem movable in the frame, a shaft secured to said steering-stem and having cranks, a second shaft in two sections one of which has a bearing fixed to the frame and the other of which has a bearing movable with the steering-stem, which sections are connected by a universal joint, operatively-connected devices on the crank-shaft and on the movable section of the two-part shaft for conveying motion from the former to the latter, power-transmitting mechanism operatively connected respectively with the fixed section of said shaft and with said wheel, and a handle independent of the crank-shaft and secured to the steering-stem, and said handle being of double-U shape, substantially as described.

3. In a driving mechanism for cycles, the combination with a bicycle-frame and a wheel to be driven, of a steering-stem movable in the frame, a shaft secured to said steering-stem and having cranks, a second shaft in two sections one of which has a bearing fixed to the frame and the other of which has a bearing movable with the steering-stem and in which said shaft-section is longitudinally movable and which sections are connected by a universal joint, means for supporting the respective sections of said shaft, operatively-connected devices on the crank-shaft and on the movable section of the two-part shaft for conveying motion from one to the other, a crank-axle, driving mechanism between the crank-axle and said wheel, and driving connections between said crank-axle and the fixed section of the two-part shaft, substantially as described.

4. In a driving mechanism for cycles, the combination with a bicycle-frame and a wheel to be driven, of a steering-stem movable in the frame provided with a handle, a shaft rotatably supported by said steering-stem and having cranks provided with grips, a second shaft in two sections one of which has a bearing fixed to the frame and the other of which has a bearing movable with the steering-stem, a sprocket-wheel on said crank-shaft, a second sprocket-wheel on the movable section of the two-part shaft, a sprocket-chain connecting said sprocket-wheels, a beveled gear fixed to the fixed section of said two-part shaft, a longitudinal shaft having beveled gears at its opposite ends one of which meshes with the other beveled gear, a crank-axle having a beveled gear meshing with the adjacent beveled gear on said longitudinal shaft, bearings on the framing for supporting said longitudinal shaft, sprocket-wheels secured respectively to the crank-axle and to the axle of the wheel to be driven, a chain connecting said last-mentioned sprocket-wheels, and cranks secured to the crank-axle and provided with pedals, substantially as described.

5. In a driving mechanism for cycles, the combination with a frame and a wheel to be driven, of a steering-stem, a shaft secured to said steering-stem and having cranks, a second shaft in two sections connected by a universal joint, a bearing for one of said shaft-sections carried by a fixed portion of the frame, a bearing for the second shaft-section movable with the steering-stem, and in which said movable shaft-section is adapted to slide as the steering-stem turns, operatively-connected devices on the crank-shaft and on the movable section of the two-part shaft for conveying motion from the former to the latter, and power-transmitting mechanism operatively connected respectively with the fixed section of said two-part shaft and with said wheel, substantially as described.

6. In a driving mechanism for cycles, the combination with a bicycle-frame and a wheel to be driven, of a steering-stem movable in the frame, a shaft secured to said steering-stem and having cranks, a second shaft in two sections operatively connected one of which has a bearing fixed to the frame and the other of which has a bearing movable with the steering-stem, operatively-connected devices on the crank-shaft and on the movable section of the two-part shaft for conveying motion from the former to the latter, and power-transmitting mechanism operatively connected respectively with the fixed section of said shaft and with said wheel, substantially as described.

In testimony that I claim the foregoing as my own I have hereto affixed my signature in the presence of two witnesses.

MARTIN E. BOLLINGER.

Witnesses:
W. J. ADAMS,
JULIUS W. FISCHER.